United States Patent [19]

Wilop

[11] 4,130,612

[45] Dec. 19, 1978

[54] AERATOR FOR BIOLOGICAL WASTE-WATER PURIFICATION

[75] Inventor: Albert Wilop, Essen, Germany

[73] Assignee: Gottfried Bischoff Bau kompl. Gasreinigungs- und Wasserrückkühlanlagen GmbH & Co. Kommanditgesellschaft, Essen, Germany

[21] Appl. No.: 830,335

[22] Filed: Sep. 2, 1977

[30] Foreign Application Priority Data

Aug. 3, 1977 [DE] Fed. Rep. of Germany ....... 2734963

[51] Int. Cl.$^2$ ............................................... B01F 3/04
[52] U.S. Cl. ...................................... 261/91; 210/219; 239/219; 239/224; 261/62; 261/66; 261/DIG. 75
[58] Field of Search ........................ 261/91, 87, 93, 66, 261/DIG. 75, 28, 29, 36 R, 62, 120; 210/242 A, 219, 220, 221 R, 221 M; 239/219–222, 223, 224

[56] References Cited

U.S. PATENT DOCUMENTS

| | | | |
|---|---|---|---|
| 3,278,170 | 10/1966 | Moritz | 261/93 X |
| 3,416,729 | 12/1968 | Ravitts et al. | 261/91 X |
| 3,610,590 | 10/1971 | Kaelin | 261/91 |
| 3,811,662 | 5/1974 | Kaelin | 261/91 |
| 3,928,512 | 12/1975 | Cherry | 261/91 |
| 4,018,859 | 4/1977 | Muller | 261/87 |

FOREIGN PATENT DOCUMENTS

1911469 11/1972 Fed. Rep. of Germany ............ 261/91

Primary Examiner—Richard L. Chiesa
Attorney, Agent, or Firm—Karl F. Ross

[57] ABSTRACT

An aerator for the biological purification of waste water comprises an undulating annular disk of sheet material, centered on a vertical axis of rotation, forming interleaved sets of upper and lower sectors interconnected by generally vertical, radially extending webs. Each lower disk sector defines with the adjacent webs an upwardly open channel whereas each upper disk sector defines with its associated webs a downwardly open channel. A central sleeve, descending from the level of the alternately upwardly and downwardly open channels, obstructs the inner ends of the latter but opens into the inner ends of the former whose effective cross-sectional area is adjustable with the aid of a vertically shiftable shutter ring inside the sleeve.

10 Claims, 5 Drawing Figures

AERATOR FOR BIOLOGICAL WASTE-WATER PURIFICATION

FIELD OF THE INVENTION

My present invention relates to an aerator designed to aid in the biological purification of waste water.

BACKGROUND OF THE INVENTION

Known devices of this type, e.g. as described in German printed specification No. 1,911,469, have a rotor centered on a substantially vertical axis of rotation and provided with radially extending webs or blades between which channels are formed for the circulation of water mixed with air when that member is rotated while being immersed in a body of water to be purified. Conventionally, the rotor comprises a stack of three horizontal annular disks on a central sleeve, the water-circulating channels being divided into an upper and a lower set formed between these disks. The channels, closed on four sides, draw water through the sleeve via their inner ends (proximal to the axis of rotation) and expel it through their outer ends (remote from the axis), thus creating separate flows at two different levels. The upper flow entrains significant quantities of air, depending upon the depth of immersion, which mixes with the lower flow as the two flows intermingle beyond the rotor periphery. Thus, the aeration rate can be varied not only by changing the rotor speed but also by raising or lowering the device with reference to the water level.

Experience has shown that channels open only at their ends tend to clog and can be cleaned only with difficulty, thereby diminishing the efficiency of the aerator. Moreover, changing the depth of immersion allows only a rather coarse adjustment of the aeration rate.

OBJECT OF THE INVENTION

The general object of my present invention, therefore, is to provide an improved aerator which avoids the drawbacks of prior-art devices of this type.

A more particular object is to provide an aerator which is compact, of simple construction, easy to keep clean and finely adjustable even during operation.

SUMMARY OF THE INVENTION

According to an important feature of my invention, the rotor of the aerator is provided with control means for varying the effective cross-sectional area of the inner ends of at least one of the two sets of channels, advantageously the channels carrying the air-entraining flow.

According to another feature of the invention, the two sets of channels constitute downwardly open first channels and upwardly open second channels which advantageously are interleaved on a common level, the inner ends of the first channels being obstructed by a central sleeve which extends downwardly from that level and is open to the inner ends of the second channels. The sleeve thus serves to create two distinct flows, i.e. a first flow rising on the outer sleeve surface and entering the downwardly open channels from below and a second flow rising within the sleeve and passing from there into the upwardly open channels with entrainment of air. Such a rotor can be easily manufactured from an undulating annular disk of sheet material surrounding the sleeve, with upper and lower sectors interconnected by the radially extending webs; the upper sectors form the tops of the first channels whereas the lower sectors act as the bottoms of the second channels.

According to a further feature of my invention, a shutter ring vertically displaceable within the sleeve serves as the aforementioned control means. The axial shifting of that ring may be brought about by an adjustable linkage anchored to the rotor, e.g. a pair of leadscrews, solenoids or fluidic jacks. The shutter ring can thus register to a greater or lesser extent with the access openings leading from the interior of the sleeve to the inner ends of the upwardly open second channels, thereby blocking these inner ends to a variable extent.

BRIEF DESCRIPTION OF THE DRAWING

The above and other features of my invention will now be described in detail with reference to the accompanying drawing in which.

SPECIFIC DESCRIPTION

Figure 1:
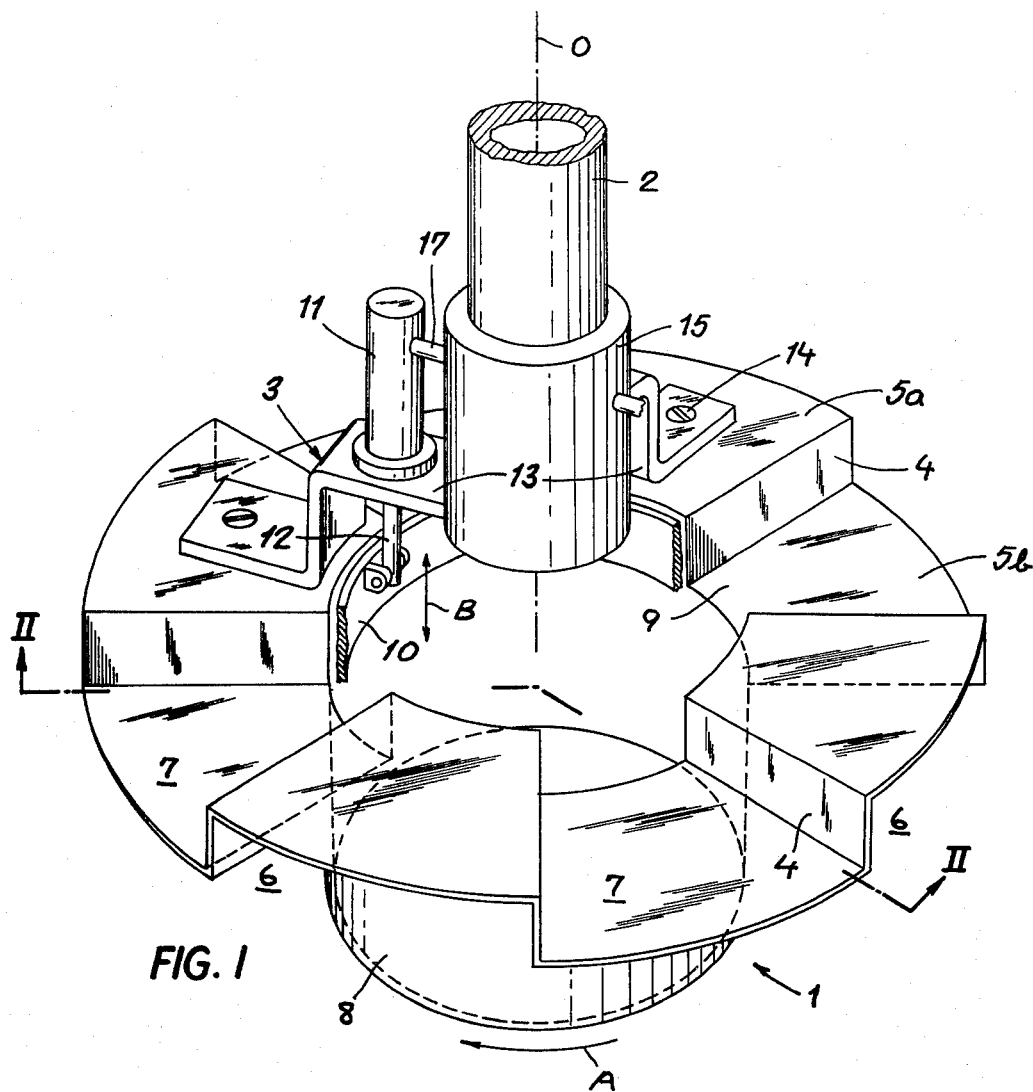
FIG. 1 is a perspective view of an aerator according to my invention, with parts broken away.
Figure 2:
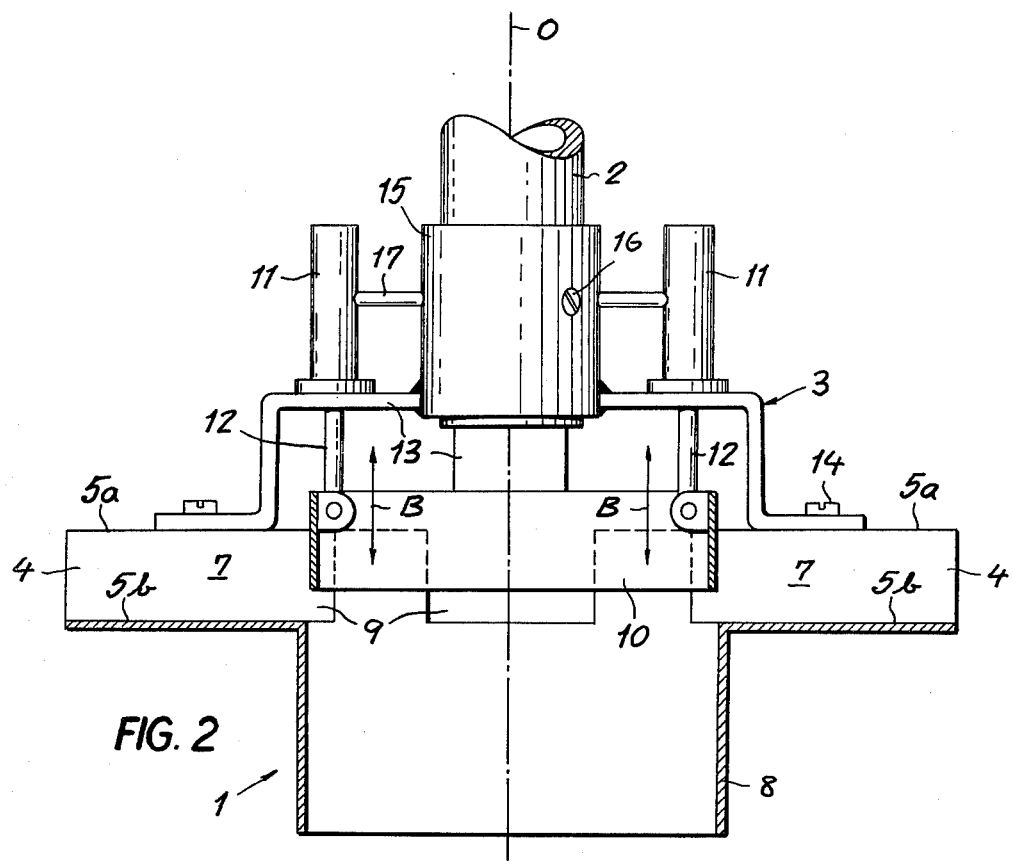
FIG. 2 is an axial sectional view of the aerator taken on the line II—II of FIG. 1.
Figure 3:
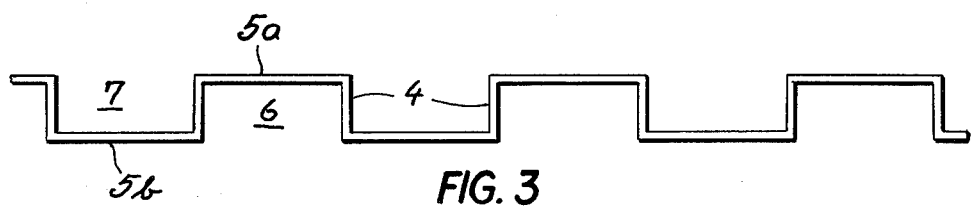
FIG. 3 is a developed view of part of the inner circumference of the rotor of the device shown in FIGS. 1 and 2.

In FIGS. 1-3 I have shown an aerator according to my invention, generally designated 1, which is centered on a vertical axis 0 and driven by a nonillustrated motor via a shaft 2. The aerator has a rotor which comprises an undulating annular disk of sheet material secured to the shaft 2 by a mounting 3, the disk including four upper sectors 5a and four lower sectors 5b which are interconnected by radially extending upstanding webs 4 and form two interleaved sets of channels 6 and 7. Channels 6, bounded laterally by the webs 4 and at the top by the disk sectors 5a, are downwardly open and also have open outer ends remote from axis 0; their inner ends are obstructed by a central sleeve 8 which is integral with the undulating disk 4, 5a, 5b. Sleeve 8 has a crenelated upper edge forming inlets 9 through which the interior of the sleeve communicates with the inner ends of channels 7 which are also open at their outer ends as well as at the top. The entire assembly 1 is rotatable about axis 0 as indicated by an arrow A in FIG. 1.

Mounting 3 comprises a hub 15 which embraces the shaft 2 and is fastened to it by a setscrew 16. Hub 15 is provided with four spider legs 13 resting on the upper ring segments 5a to which they are secured by screws 14. Shutter ring 10 is vertically displaceable inside sleeve 8, as indicated by arrows B, with the aid of a linkage comprising a pair of cylinders 11 on two diametrically opposite legs 13; cylinders 11 have pistons with rods 12 hinged to ring 10. These pistons could be spring-loaded and pneumatically actuated, for example, through the interior of shaft 2 via tubes 17; they could also be the cores of solenoids energizable by wires within the shaft. In either case, the relative elevation of ring 10 can be adjusted during operation, with or without simultaneous change in the rotor speed, to vary the aeration rate.

As will be readily apparent, rotation of the device 1 immersed in a body of water causes centrifugal acceleration of the liquid in channels 6 and 7 by the webs or blades 4 to create two distinct flows, one of them passing externally of sleeve 8 into the downwardly open channels 6 while the other rises within the sleeve and enters the upwardly open channels 7 through inlet openings 9. It is this latter flow which entrains a certain amount of air depending in part on the depth of immersion and in part on the setting of shutter ring 10. The mobility of the latter affords a particularly precise adjustability of the aeration rate.

Figure 4:
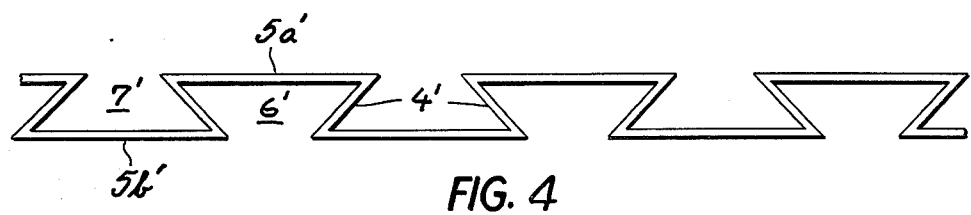
FIG. 4 is a view similar to FIG. 3, illustrating a modification.

In the embodiment of FIGS. 1 and 2 the webs 4 are vertical and the disk sectors 5a, 5b are horizontal whereby the profiles of channels 6 and 7 are rectangular as best seen in FIG. 3. In FIG. 4, however, I have illustrated the possibility of inclining the webs 4' to the vertical so as to let the sides of channels 6' converge downwardly, with resulting overlapping of disk sectors 5a' and 5b' to produce relatively inverted dovetail profiles for channels 6' and 7'. In either case, furthermore, the disk sectors could be pitched instead of level to let the channels expand in cross-section with increasing distance from axis 0; they could also be curved instead of flat.

Figure 5:
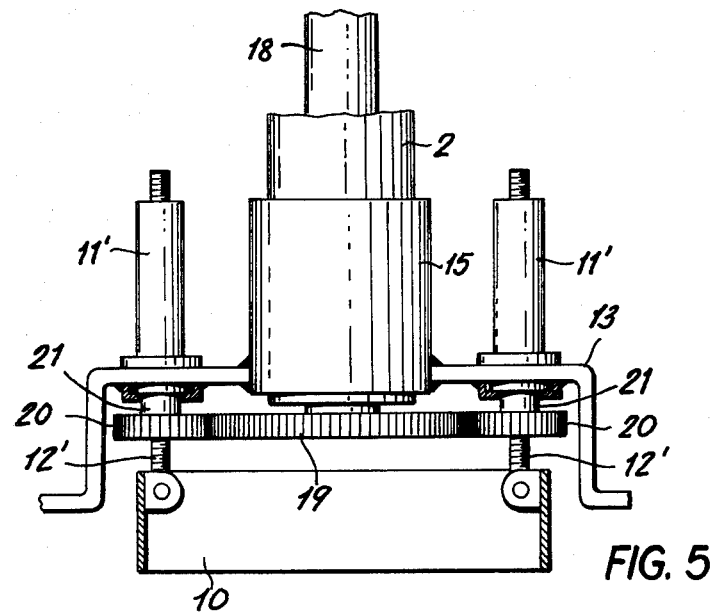
FIG. 5 is a fragmentary sectional view similar to FIG. 2, showing another variant.

The aforedescribed electrical or fluidic control of linkage 11, 12 could be replaced by a mechanical transmission inside the tubular shaft 2, as illustrated in FIG. 5. There, a stem 18 coaxial with shaft 2 carries a gear 19 which meshes with gears 20 that are rigid with nuts 21 in mating engagement with leadscrews 12', the latter being hinged to shutter ring 10 and slidably guided in cylinders 11'. Thus, relative rotation of shaft 2 and stem 18 (e.g. through a planetary-gear drive) again raises or lowers the ring 10 with reference to spider legs 13.

I claim:

1. An aerator for the biological purification of waste water, comprising:
   a rotor centered on a substantially vertical axis, said rotor forming sets of first and second radial channels laterally bounded by radially extending webs, said channels having inner ends proximal to said axis and open outer ends remote from said axis;
   inlet means on said rotor giving access to the inner ends of said first and second channels from different regions of a surrounding body of water to be purified, said inlet means including an axially extending open-ended central sleeve communicating with the inner ends of said second channels and defining a flow path along which atmospheric air is entrainable by water outflowing through said second channels upon limited immersion of said rotor into said body; and
   adjustable control means on said rotor including a cylindrical annular shutter axially displaceable within said sleeve for blocking the inner ends of said second channels to a variable extent.

2. An aerator as defined in claim 1 wherein said first channels are downwardly open and said second channels are upwardly open.

3. An aerator as defined in claim 2 wherein said sets of channels are interleaved and disposed on a common level, said sleeve extending downwardly from said level and being open to the inner ends of said second channels while obstructing the inner ends of said first channels.

4. An aerator as defined in claim 3 wherein said control means further comprises an adjustable linkage supporting said shutter on said rotor.

5. An aerator as defined in claim 4 wherein said rotor comprises an undulating annular disk of sheet material surrounding said sleeve and having upper and lower sectors interconnected by said webs, said upper sectors forming the tops of said first channels, said lower sectors forming the bottoms of said second channels.

6. An aerator as defined in claim 5 wherein said disk is provided with a hub having legs attached to a plurality of said upper sectors, further comprising a drive shaft centered on said axis and connected with said hub.

7. An aerator as defined in claim 6 wherein said linkage is anchored to said hub.

8. An aerator as defined in claim 7 wherein the number of upper sectors and the number of lower sectors are even, said linkage being secured to a pair of said legs attached to two diametrically opposite upper sectors.

9. An aerator for the biological purification of waste water, comprising:
   an undulating annular disk of sheet material rotatably centered on a substantially vertical axis, said disk having upper and lower sectors interconnected by radially extending webs which form lateral boundaries of interleaved downwardly open first channels and upwardly open second channels having inner ends proximal to said axis and open outer ends remote from said axis, said upper sectors forming the tops of said first channels, said lower sectors forming the bottoms of said second channels;
   inlet means on said disk giving access to the inner ends of said first and second channels from different regions of a surrounding body of water to be purified, said inlet means including an open-ended central sleeve which extends downwardly from said disk and is open to the inner ends of said second channels while obstructing the inner ends of said first channels, thereby defining a flow path along which atmospheric air is entrainable by water outflowing through said second channels upon limited immersion of said disk into said body; and
   adjustable control means on said disk including a cylindrical annular shutter axially displaceable within said sleeve for blocking the inner ends of said second channels to a variable extent.

10. An aerator as defined in claim 9 wherein the webs bounding any of said first channels converge downwardly, thereby giving said first and second channels relatively inverted dovetail profiles.

* * * * *